(12) United States Patent
Biondi et al.

(10) Patent No.: US 6,666,322 B2
(45) Date of Patent: Dec. 23, 2003

(54) VARIABLE CAPACITY STORAGE UNIT FOR COMMODITIES

(75) Inventors: Andrea Biondi, Bologna (IT); Fiorenzo Draghetti, Bologna (IT)

(73) Assignee: G. D S.p.A., Bologna (IT)

( * ) Notice: Subject to any disclaimer, the term of this patent is extended or adjusted under 35 U.S.C. 154(b) by 0 days.

(21) Appl. No.: 10/181,400

(22) PCT Filed: Jan. 17, 2001

(86) PCT No.: PCT/IB01/00036

§ 371 (c)(1),
(2), (4) Date: Jul. 17, 2002

(87) PCT Pub. No.: WO01/55015

PCT Pub. Date: Aug. 2, 2001

(65) Prior Publication Data

US 2003/0000811 A1 Jan. 2, 2003

(30) Foreign Application Priority Data

Jan. 27, 2000 (IT) .................... BO2000A0032

(51) Int. Cl.$^7$ ..................... B65G 1/00; B65G 37/00; B65G 13/02; B65G 21/18
(52) U.S. Cl. .................. 198/347.1; 198/347.4; 198/778

(58) Field of Search .............. 198/347.1, 347.4, 198/443, 588, 594, 778, 812

(56) References Cited

U.S. PATENT DOCUMENTS

| 3,318,439 | A | | 5/1967 | Sullivan |
| 5,413,213 | A | | 5/1995 | Golz et al. |
| 5,490,589 | A | | 2/1996 | Golz et al. |
| 5,772,005 | A | * | 6/1998 | Hansch ........... 198/594 |
| 6,260,688 | B1 | * | 7/2001 | Steeber et al. ...... 198/594 |

FOREIGN PATENT DOCUMENTS

| DE | 4413762 | 1/1995 |
| EP | 0774214 | 5/1997 |
| GB | 2300613 | 11/1996 |

* cited by examiner

Primary Examiner—Gene O. Crawford
(74) Attorney, Agent, or Firm—Davidson Berquist Klima & Jackson, LLP

(57) ABSTRACT

Packets (2) transferred from a packing machine to an overwrapping machine pass through an in-line storage unit (1) of variable capacity internally of which they are directed along a path (P) between a loading station (3) and an unloading station (4); the unit (1) includes a succession of conveying members (19) each describing a closed loop path (P1) and set in motion by a corresponding motor (30), and chutes (44) by which the conveying members (19) are linked in series.

26 Claims, 11 Drawing Sheets

VARIABLE CAPACITY STORAGE UNIT FOR COMMODITIES

This application is the national phase of international application PCT IB01/00036 filed Jan. 17, 2001 which designated the U.S. and that international application was published under PCT Article 21 (2) in English. This application claims priority to Italian Patent Application No. BO2000A 000032 filed Jan. 27, 2000.

TECHNICAL FIELD

The present invention relates to a storage unit of variable capacity for commodities.

The invention disclosed relates to a storage unit of variable capacity designed for installation in-line between an upstream machine and a downstream machine, such as will accumulate and/or release a variable number of commodities, and in particular packets of cigarettes, to which explicit reference is made throughout the following specification albeit with no limitation in scope implied.

BACKGROUND ART

It is standard practice in the tobacco industry for an upstream machine, typically a packer, to be linked to a downstream machine consisting generally in a cellophaner, by way of a variable capacity storage unit able to function as a reservoir for packets passing from the one machine to the other. Such a reservoir is in fact able to compensate both for an interruption or reduction in the supply of packets to the cellophaner, occasioned for example by a stoppage or a momentary drop in tempo of the packer, and for an insufficient uptake of packets turned out by the packer as a result of a stoppage or drop in tempo of the cellophaner.

With a reservoir of variable capacity between the packer and the cellophaner, accordingly, it becomes possible to ensure that a stoppage or drop in tempo of either machine will not adversely affect the operation of the system of which the two machines form a part, at least for a time dependent on the capacity of the storage unit employed.

Finding application to advantage among variable capacity storage units embraced by the prior art is the type identified as first-in-first-out, or FIFO, in which the packets first to be taken up are also the packets first to be released. In familiar FIFO units, the packets advance in an ordered succession along a path extending between a loading station and an unloading station. The number of packets in the storage unit at any given moment, and therefore the capacity of the reservoir, will vary with the variation in ratio between the number of packets fed in and the number of packets released, per unit of time.

One such conventional variable capacity storage unit appears substantially as a single continuous conveyor of helical geometry consisting for example in a flexible power driven belt coinciding with the aforementioned path and capable of advancing the packets from the loading station to the unloading station.

To ensure a continuous supply of packets to the cellophaner when using a storage unit of this type, the appropriate distribution internally of the unit is maintained in such a manner that the packets are ordered in a continuous column; consequently, the capacity of the reservoir is dictated by the length of the path, which can be varied only through the agency of external means such as will allow the positions of the loading station and the unloading station to be moved in relation to the path.

Accordingly, and significantly, in the event that the rate at which the packets are taken up by the cellophaner is slower than the rate at which the packets are turned out by the packer, there will be a call for the reservoir to increase its capacity, with the result that the column of packets forming gradually at the infeed station of the cellophaner, and in the storage unit itself, becomes longer and longer.

The stresses to which the packets making up the column are subjected will increase as the length of the column gradually increases, especially at the end nearest the infeed of the cellophaner; indeed beyond certain limits the consecutive packets will strike one another and the stresses attributable to sliding contact are of an order such as to cause damage to the contents.

It will be clear that first-in first-out storage units of this type betray serious limitations as regards both their capacity and the variation of their capacity, and are able thus to compensate for imbalances in throughput between the machines of a system for short periods only.

The object of the present invention is to provide a storage unit of variable capacity for commodities that will be free of the drawbacks mentioned above, yet simple from the constructional standpoint, in which packets can be transferred from the loading station to the unloading station without suffering damage.

DISCLOSURE OF THE INVENTION

The stated object is realized in a storage unit of variable capacity for commodities, establishing a path along which the commodities are caused to advance between a loading station and an unloading station, characterized in that it comprises at least two conveying members associated each with drive means serving to set the selfsame conveying members in motion, and means by which to link the conveying members in series.

The invention will now be described in detail, by way of example, with the aid of the accompanying drawings, in which.

Figure 1:
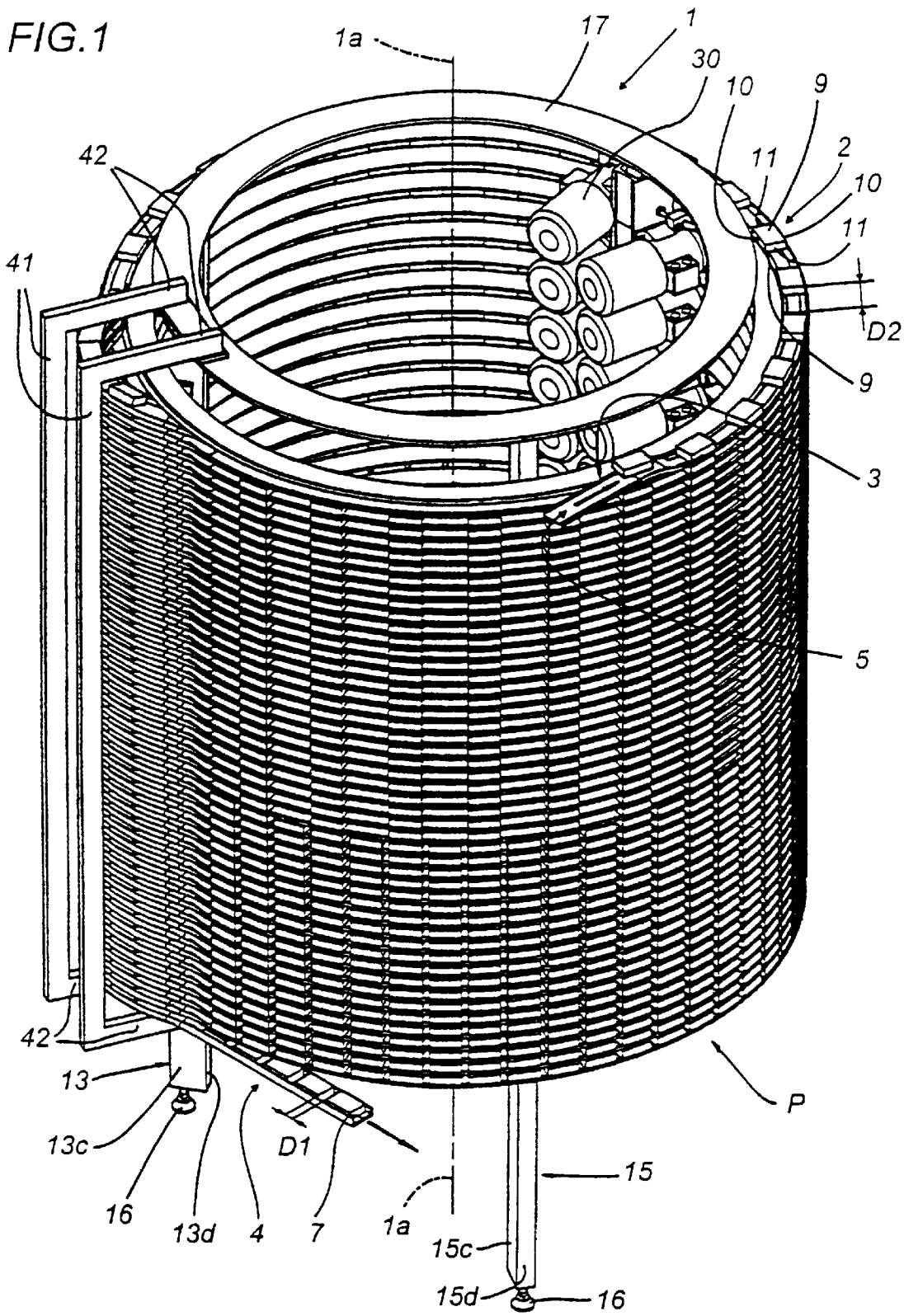
FIG. 1 illustrates a storage unit for packets of cigarettes according to the present invention, shown schematically and in perspective.
Figure 2:
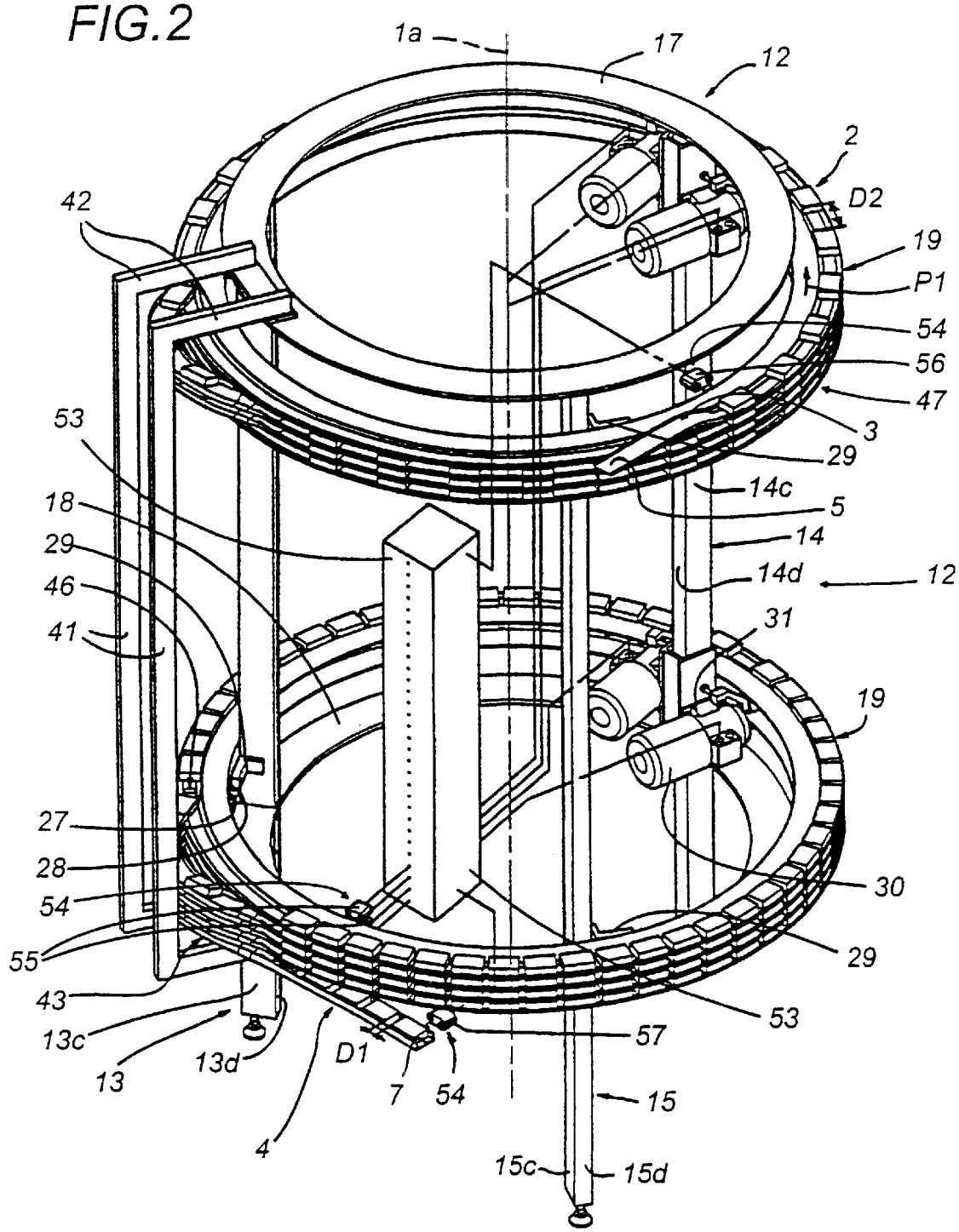
FIG. 2 illustrates the storage unit of FIG. 1, schematically and in perspective, and with certain parts omitted for clarity.
Figure 3:
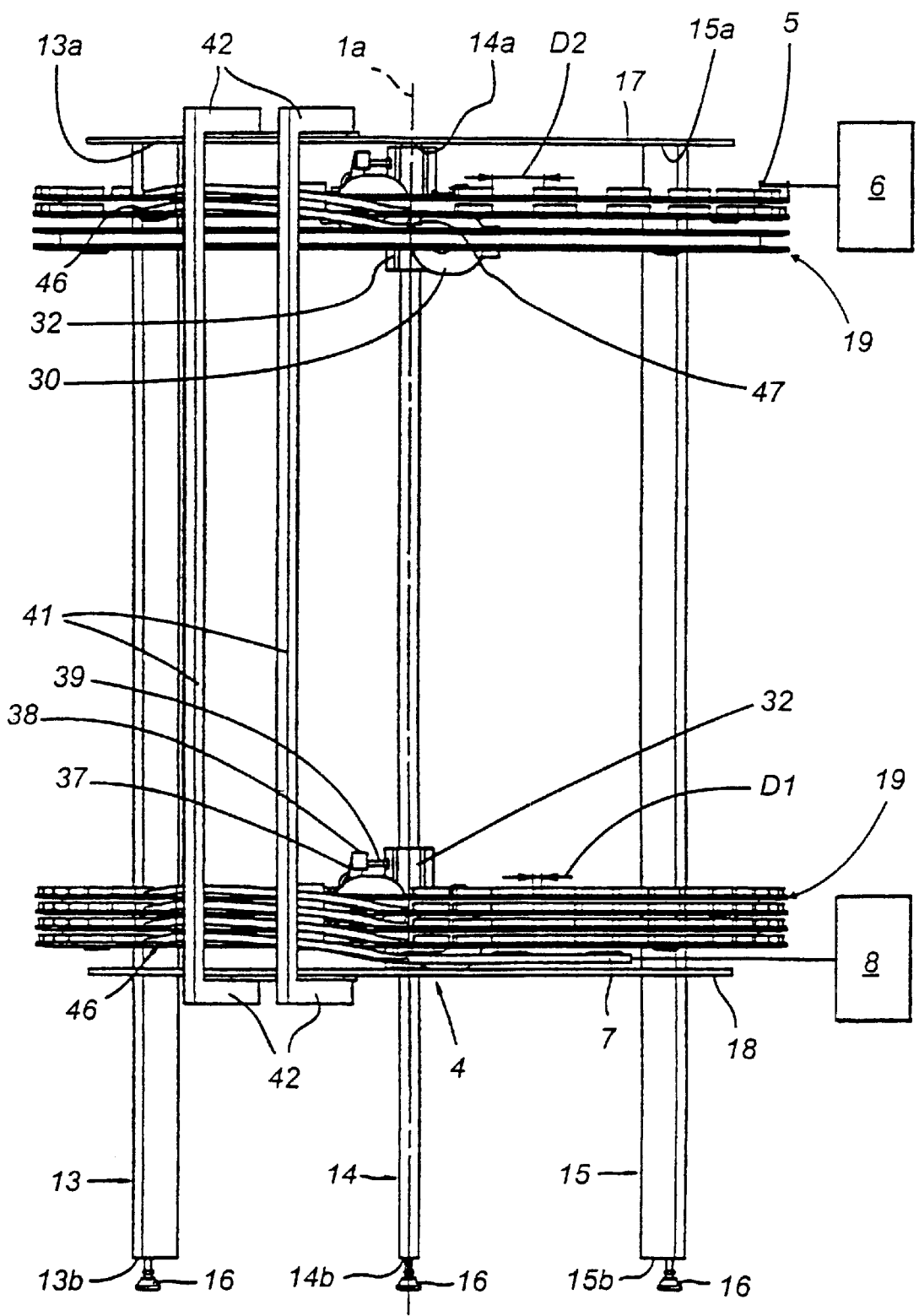
FIG. 3 illustrates the storage unit of FIG. 2 in a schematic side elevation.

Referring to FIGS. 1, 2 and 3 of the drawings, 1 denotes a storage unit, in its entirety, such as will contain a variable number N of commodities, consisting preferably in packets 2, and transfer the selfsame packets 2 between a loading station 3 and an unloading station 4 along a predetermined path P, in a predetermined direction D.

Observing FIGS. 1 and 2, the loading station 3 is located at the outfeed 5 of a cigarette packer indicated as a block denoted 6 in FIG. 3, and the unloading station 4 is located at the infeed 7 of a cellophaner indicated by a block denoted 8 likewise in FIG. 3.

The packets 2, each of which exhibiting two main side faces 9, two smaller flank faces 10 and two end faces 11, are directed from the packer 6 into the storage unit 1 by way of the loading station 3 and released from the unit 1 to the cellophaner 8 by way of the unloading station 4.

The storage unit 1 is a first-in first-out (FIFO) type, signifying that a given packet 2 fed in first at the loading station 3 is also the first packet to be released at the unloading station 4.

The storage unit 1 is essentially cylindrical in appearance, with a predominating vertical axis 1a, and comprises a frame 12 having three uprights 13, 14 and 15 of which the bottom ends are fitted with respective floor mounts 16 and the ends uppermost are connected to a top circular bracing hoop 17 occupying a plane perpendicular to the axes of the uprights 13, 14 and 15.

The frame 12 further comprises a bottom circular bracing hoop 18 (FIGS. 2 and 3) disposed parallel to the top hoop 17 and of identical dimensions, to which the uprights 13, 14 and 15 are connected at a short distance above the floor mounts 16.

The storage unit 1 is compassed between the two circular hoops 17 and 18 and comprises a plurality of conveying members 19 ordered in succession along the vertical axis 1a, occupying respective mutually parallel planes spaced-apart one from the next and disposed transversely to the selfsame axis 1a.

Referring to FIGS. 2, 4, 5 and 6, the conveying members 19 function as independent storage modules of the storage unit 1, appearing as a succession of mutually coaxial circular elements centred on the vertical axis 1a.

Each conveying member 19 follows a looped path P1 and comprises an internal horizontal annular web 20 of which an outer edge 20b is joined to a vertical cylindrical side wall 21 functioning as a support for two annular channels 22, and an inner edge 20a presents a downwardly directed rim 23.

In the example of FIGS. 3, 4, 5 and 6, each of the two annular channels 22, which occupy mutually parallel planes, appears as a shelf 24 affording an annular way 25 on which the packets 2 lie disposed longitudinally; more precisely, the annular way 25 is fashioned with a central annular depression 26 that serves to reduce the area of contact between the annular way 25 and the corresponding main side face 5 of the packet 2.

Each annular way 25 is compassed internally and externally by respective vertical annular walls 62 and 63 set apart by a distance marginally greater than the transverse dimension of a single packet 2.

Figure 6:
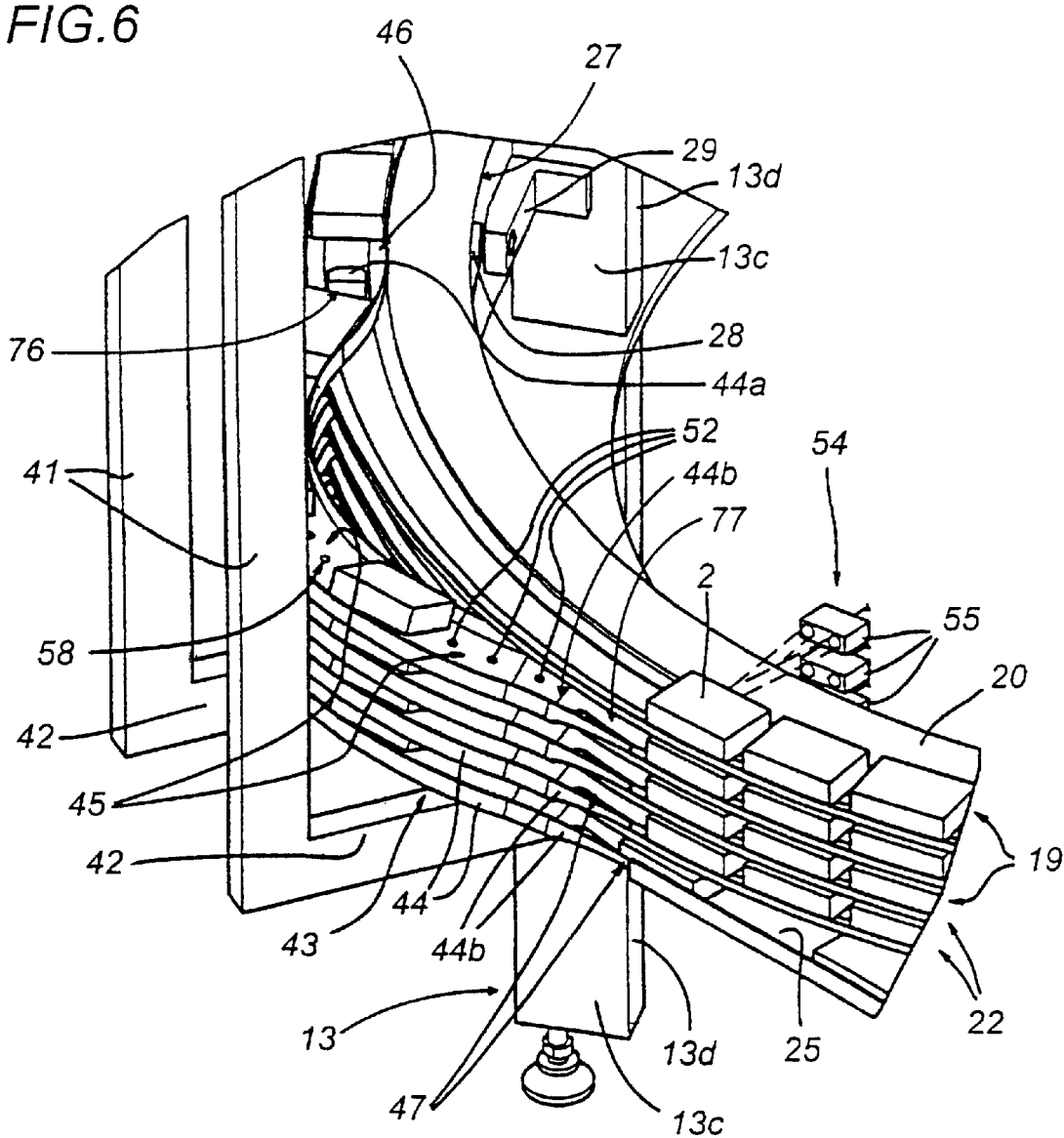
FIG. 6 shows another enlarged detail of FIG. 2 viewed schematically and in perspective.

As discernible from FIGS. 2 and 6, the internal annular web 20 of each conveying member 19 affords a downwardly directed surface 27 by way of which it is supported on respective freely revolving bearing rollers 28. The rollers 28 are mounted in turn to the uprights 13 and 15 by way of respective angle brackets 29 of which the shorter leg is associated rigidly with the relative upright.

As illustrated in FIGS. 1, 2, 4, 5 and 8, each individual conveying member 19 is associated with a relative motor 30 by which it can be set in motion about the axis 1a of the storage unit 1.

Figure 4:
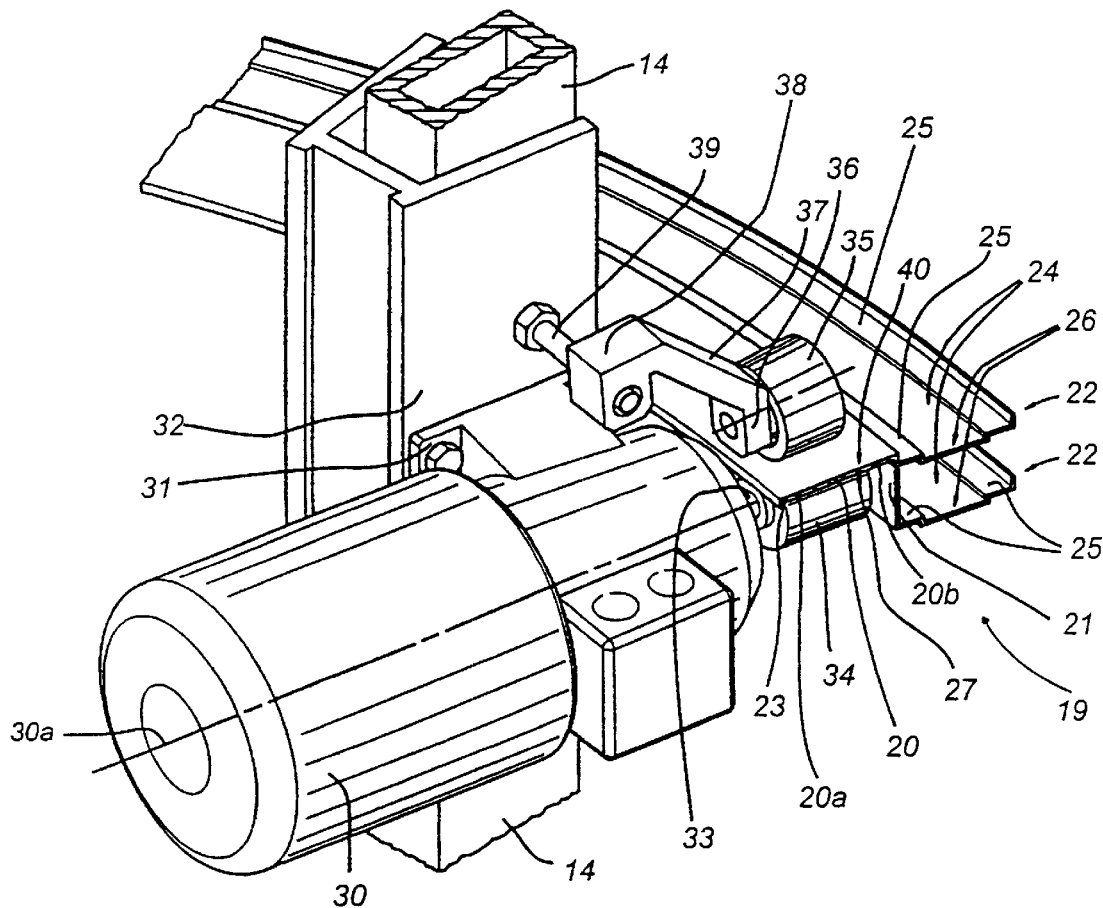
FIG. 4 shows an enlarged detail of FIG. 2, viewed schematically and in perspective.
Figure 5:
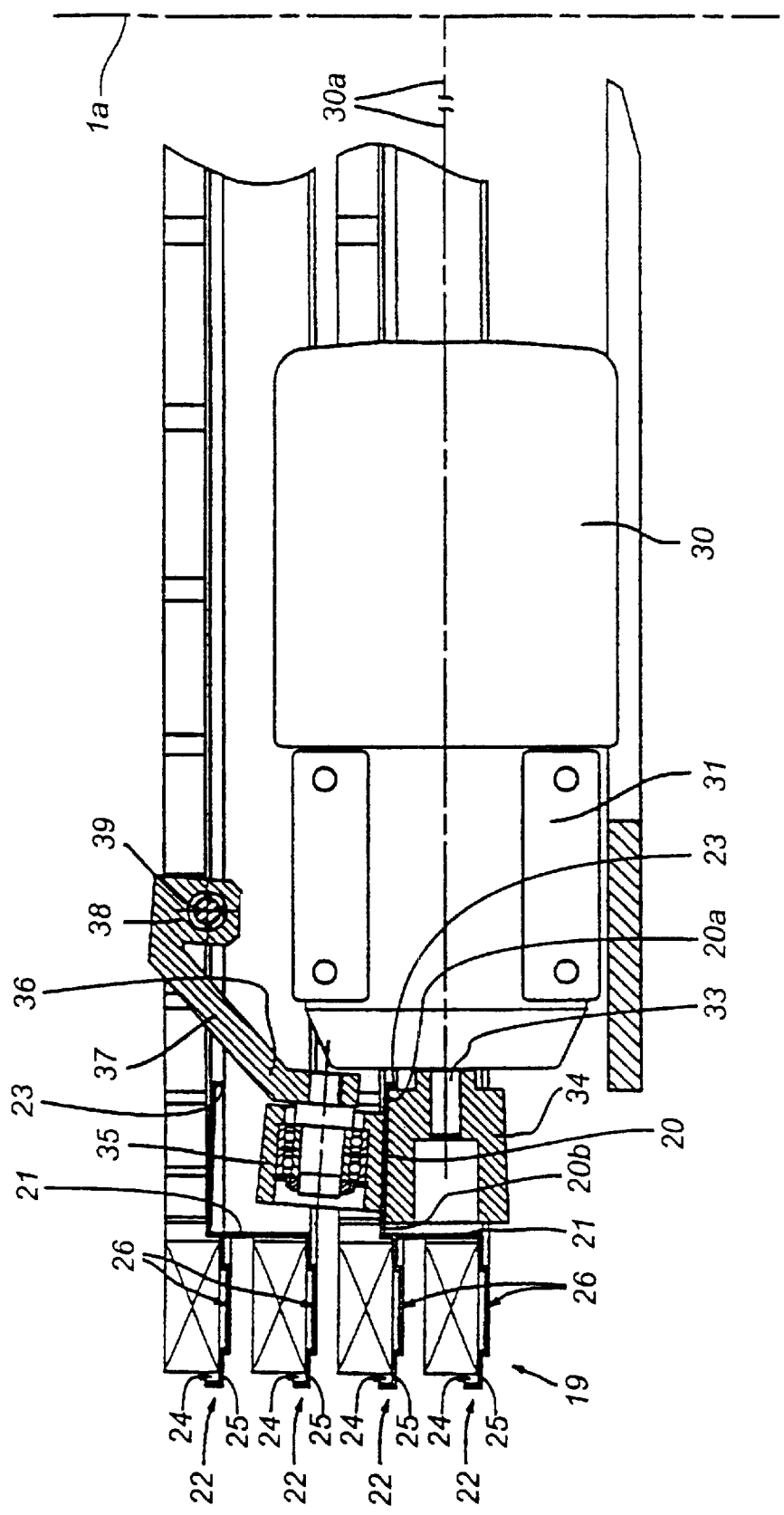
FIG. 5 shows the same enlarged detail as in FIG. 4 in a schematic side elevation with certain parts in section and others omitted.

Referring to FIGS. 4 and 5 in particular, each motor 30 is mounted to a plate 31 connected rigidly in turn to a rail 32 slidable on one upright 14, occupying a position with the respective axis 30a radially disposed relative to the storage unit 1 and intersecting the vertical axis 1a.

The output shaft 33 of each motor 30 carries a respective keyed wheel 34 offered in contact to the aforementioned surface 27 of the annular web 20 and combining thus with the freely revolving rollers 28 carried by the remaining two uprights 13 and 15 to support the relative conveying member 19.

The keyed wheel 34 is made of resilient material and operates in conjunction with a freely revolving pinch roller 35 rotatable about an axis parallel to the axis 30a of the motor 30; the pinch roller 35 is positioned on the side of the internal annular web 20 opposite to the keyed wheel 34 and carried by the free end 36 of an arm 37 connected rotatably by the opposite end 38 to a pivot 39, associated rigidly with the rail 32, of which the axis extends transversely to the axis 30a of the motor 30.

The pinch roller 35, likewise made of a resilient material, is placed in contact with the upwardly directed surface 40 of the internal annular web 20 and operates in conjunction with the keyed wheel 34 in such a way that the conveying member 19 can be driven by friction without any slipping contact between the wheel 34 and the annular web 20.

In practice therefore, the keyed wheel 34 and the relative surface 27 are clutch-coupled in such a way as to drive the relative conveying member 19 in rotation about the axis 1a of the storage unit 1.

Observing FIGS. 1, 2, 3 and 6, it will be seen that the frame 12 of the unit 1 further comprises a pair of C-shaped bars 41 extending parallel to the axis 1a and connected by way of respective arms 42 at each end to the top and bottom bracing hoops 17 and 18.

The bars 41 serve to support means 43 by which the annular channels 22 of the conveying members 19 are linked one to the next. More exactly, each of the linking means 43 comprises a relative chute 44 by which the annular way 25 of a given channel 22 is connected to the annular way 25 of the channel next in succession with no break in continuity. The linking means 43 thus serve to connect each annular channel 22 with the next annular channel 22, be it a connection between channels forming part of one conveying member 19 or channels belonging to two distinct conveying members, in such a way that the path P followed by the packets 2 internally of the storage unit 1 is rendered continuous.

In particular, each chute 44 comprises propulsion means 45 using compressed air, by which the single packets 2 are conveyed along the chute 44, the ends 44a and 44b of the chute being shaped in such a way as to afford an ascent ramp 76 and a descent ramp 77, respectively, creating a seamless join between the annular ways 25 of the interconnected annular channels 22 and facilitating the passage of a packet 2 from one annular channel 22 by way of the ascent ramp 76 onto the chute 44 and thence by way of the descent ramp 77 onto the channel 22 next in succession.

The positioning of the chute 44 relative to the annular channel 22 is such that the end denoted 44a coincides with an exit position 46 at which the packets 2 run off the one channel 22, and the end denoted 44b with an entry position 47 at which the packets 2 run onto the next annular channel 22.

Figure 7:
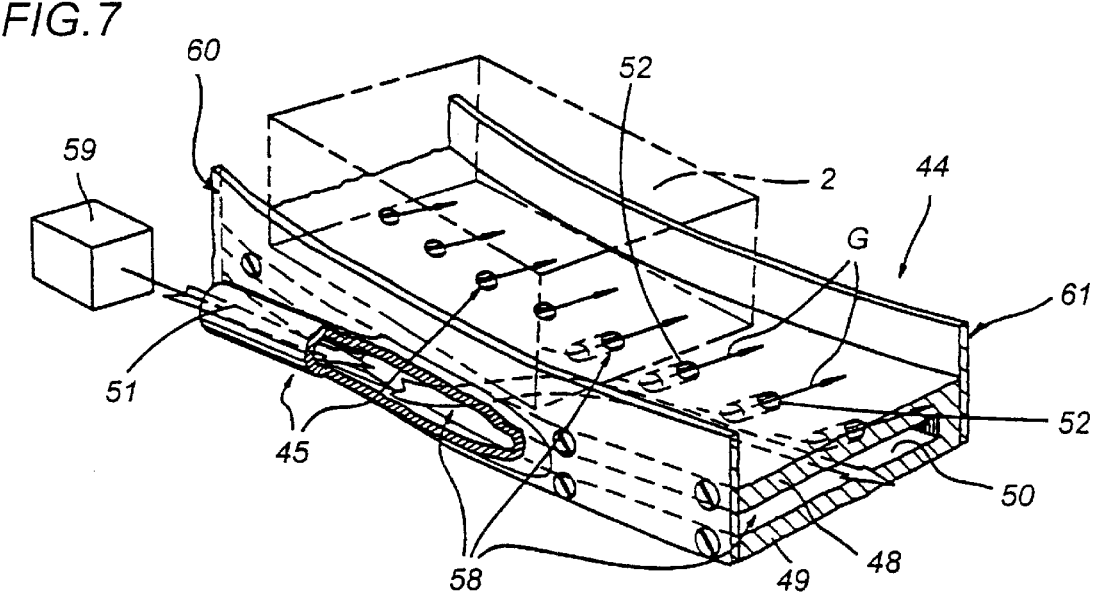
FIG. 7 shows a further enlarged detail of FIG. 2, viewed schematically and in perspective.

Referring to FIGS. 6 and 7, in particular, each chute 44 also incorporates relative manifold means denoted 58 in their entirety and, as illustrated to best advantage in FIG. 7, comprising two mutually parallel walls 48 and 49 of which the uppermost, denoted 48 in FIG. 7, affords the surface on which the packets 2 slide along the chute 44.

The two walls 48 and 49 are joined at the two ends 44a and 44b of the chute 44 and form the top and bottom sides of a chamber 50 enclosed laterally by two vertical walls 60 and 61 extending along the chute 44, of which two free edges project above the sliding surface afforded by the top wall 48. The chamber 50 is connected by way of a duct 51 on the side of one vertical wall 60 with a source 59 of pressurized fluid, and by a plurality of holes 52 with the sliding surface of the top wall 48. The holes 52 are inclined at an angle of less than 90° along the direction D followed by the packets 2 and distributed uniformly along the sliding surface of the top wall 48, in such a way as to gather a flow of air from the pressurized source 59 into jets G constituting the propulsion means 45 by which the packets 2 are advanced.

As illustrated particularly in FIG. 2 and in FIG. 6, the storage unit 1 also includes a master controller 53 interlocked to a plurality of sensors denoted 54 in their entirety and numbering at least one for each conveying member 19. The sensors 54 are designed to generate respective output signals both indicating the proximity of the packets 2 and identifying the position occupied by each packet 2 relative to the packets preceding and following along each annular channel 22 of each conveying member 19, and to send these same signals to the controller 53.

More exactly, the sensors 54 in question could be photocells, by way of example, and will include one sensor 55 located at the entry position 47 of each conveying member 19, another sensor 56 covering the loading station 3 and a further sensor 57 covering the unloading station 4, designed respectively to indicate the extent to which the single conveying member 19 has been filled, the number of packets 2 admitted to the storage unit 1, and the number of packets 2 released from the unit 1.

The controller 53 is also connected on the output side to each of the motors 30 and responds to the information received from the single sensors 54 by trimming the speed at which the conveying member 19 rotates about the axis 1a of the unit 1, thereby controlling the rate at which the packets 2 are advanced along each conveying member 19 in relation to the feed rate of the packets 2 revolving on the next conveying member 19 in sequence, in such a way as to verify and regulate the extent to which the conveying member 19 is filled.

Figure 9:
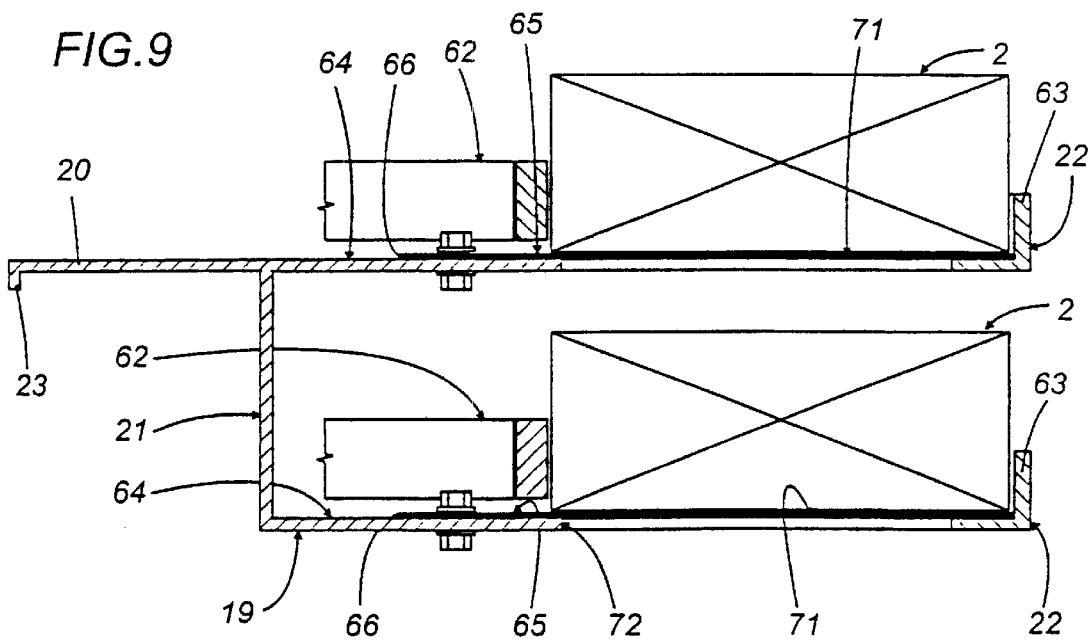
FIG. 9 and FIG. 10 show a detail of FIG. 8, enlarged and in two schematic sectional views taken on different cutting planes denoted IX—IX and X—X respectively.

In the example of FIGS. 8 to 12, the annular way 25 afforded by the shelf 24 of each channel 22 presents a flat surface 64 compassed internally and externally by respective vertical annular walls 62 and 63 as aforementioned. In addition, a flexible annular foil 65 is associated with each annular channel 22, anchored by way of an internal edge 66 to the flat surface 64 and disposed normally in contact with this same surface 64 as illustrated in FIG. 9.

Also associated with each annular channel 22 are deflector means 67 interposed between the flat surface 64 of the annular way 25 and the foil 65 at a location coinciding with the linking means 43.

Figure 8:
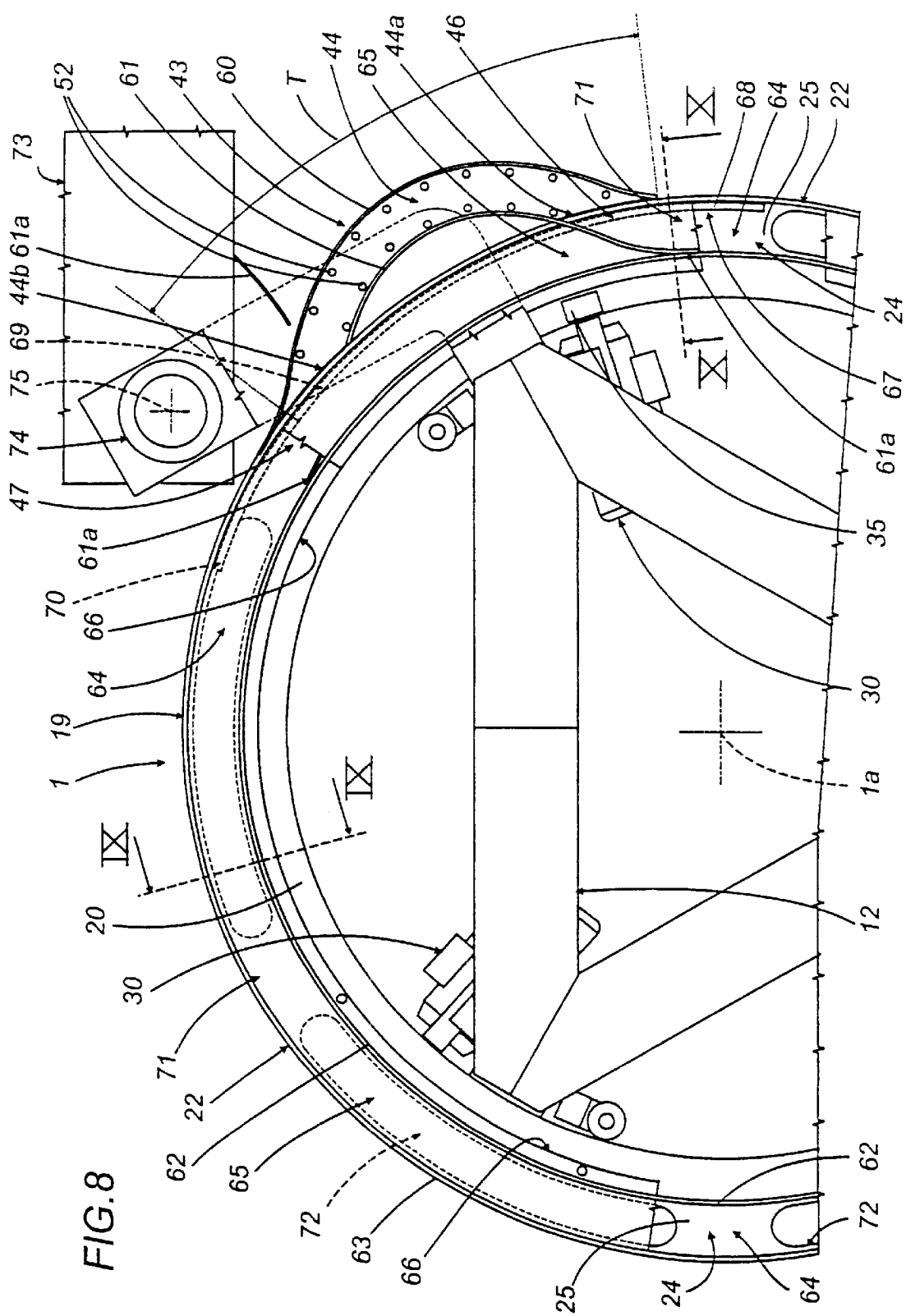
FIG. 8 shows a detail of the storage unit in FIG. 1, illustrated in an alternative embodiment, viewed schematically in plan and with certain parts omitted.
Figure 10:
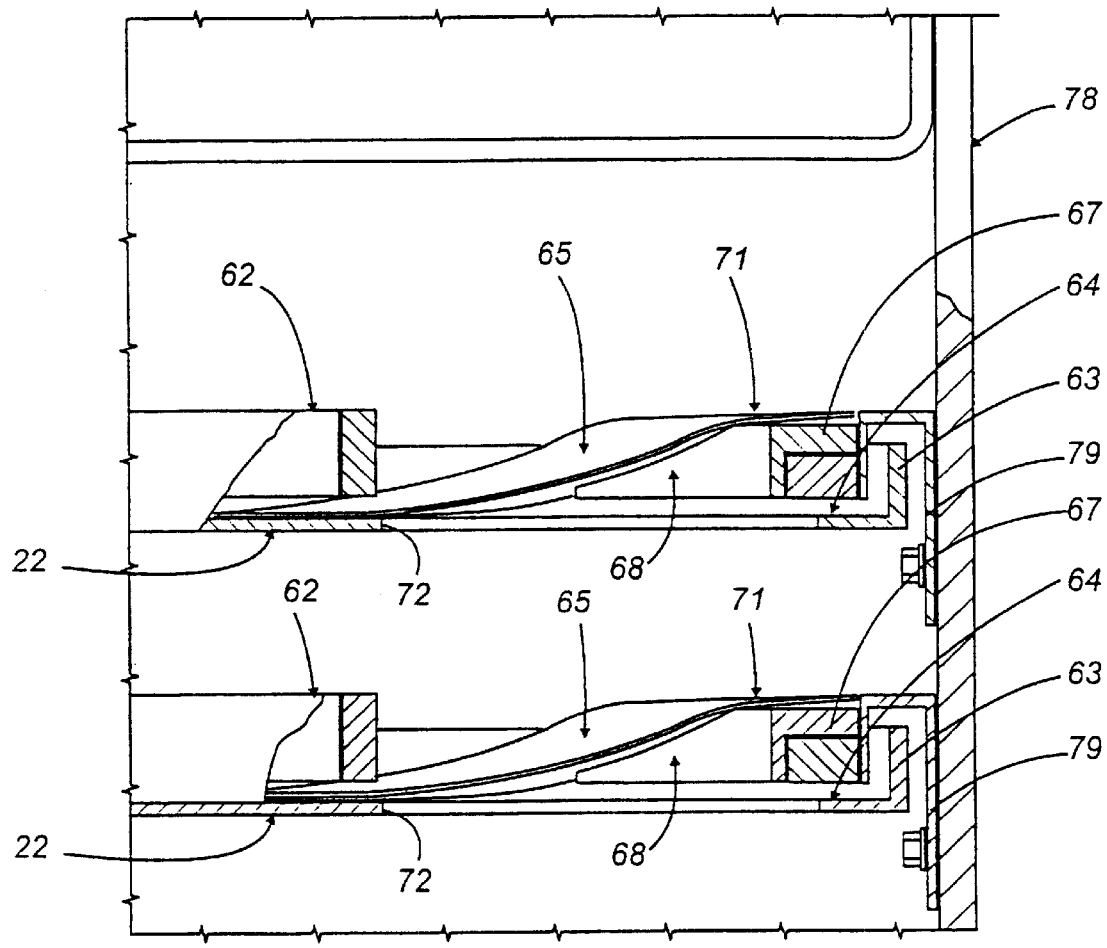
Figure 11:
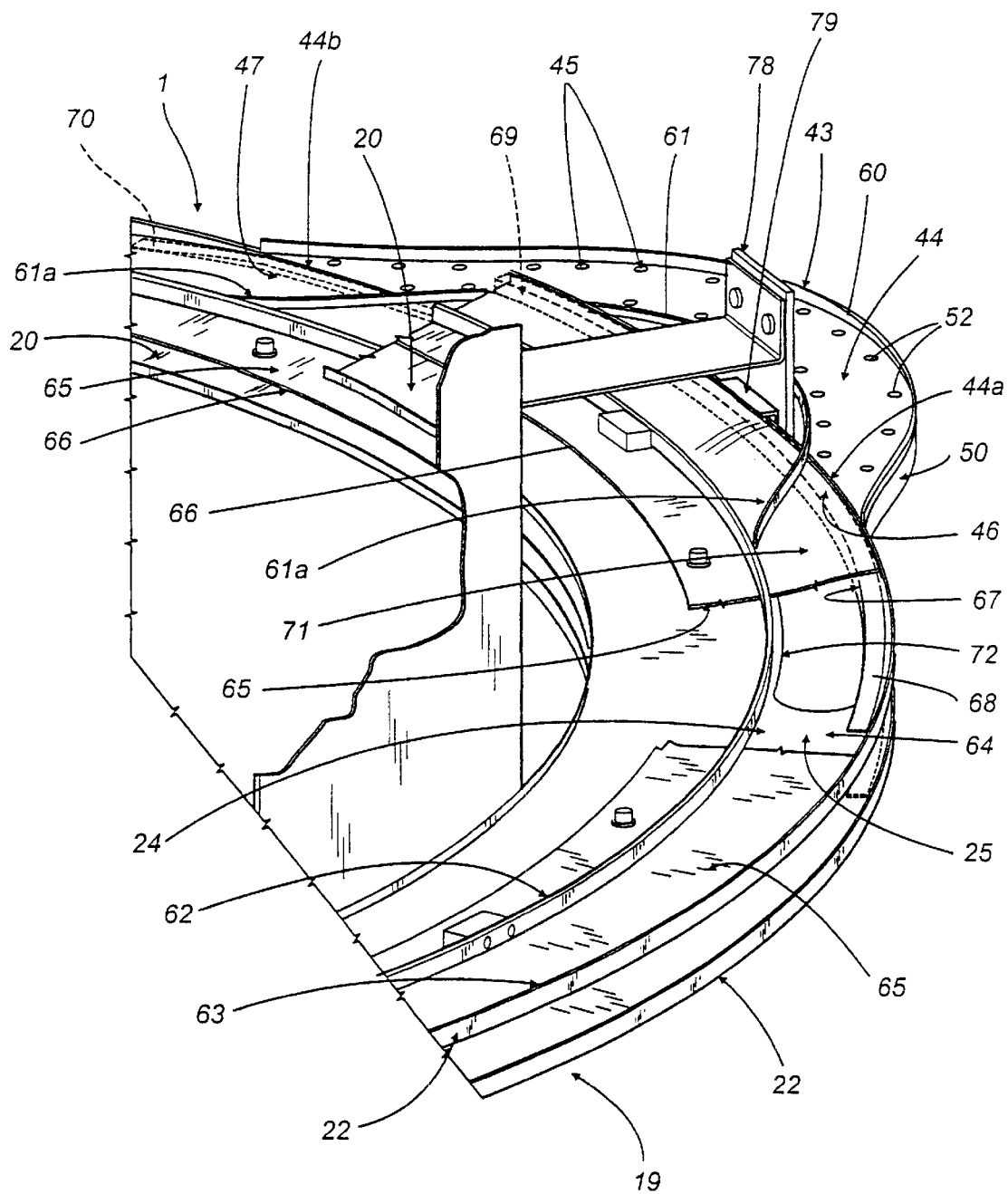
FIG. 11 shows a detail of FIG. 8, viewed schematically and in perspective with certain parts omitted.

Referring to FIGS. 8, 10 and 11, each of the deflector means 67 consists in a curved strip 67 occupying a fixed position substantially breasted with the external vertical annular wall 63 and with the flat surface 64 afforded by the annular way 25 of the relative annular channel 22; considered in the direction of rotation followed by the conveying members 19 (anticlockwise as seen in the drawings) the curved strip 67 exhibits a first portion 68 of ascending wedge profile, a second portion 69 of constant height equal to the height of the external vertical wall 63 of the annular channel 22, and a third portion 70 of descending wedge profile.

As discernible in FIG. 8 and FIG. 11, the ascending first portion 68 is located immediately preceding the exit position 46 of the respective annular channel 22, whilst the second portion 69 of constant height coincides with an arc T extending between the exit and the entry positions 46 and 47, and the descending third portion 70 is located immediately beyond the entry position 47 of the selfsame annular channel 22.

With reference to FIGS. 10 and 11, the curved strips 67 are supported by a common frame 78, to which they are connected by respective brackets 76, occupying a fixed position and aligned vertically on the predominating axis 1a of the storage unit 1.

Figure 12:
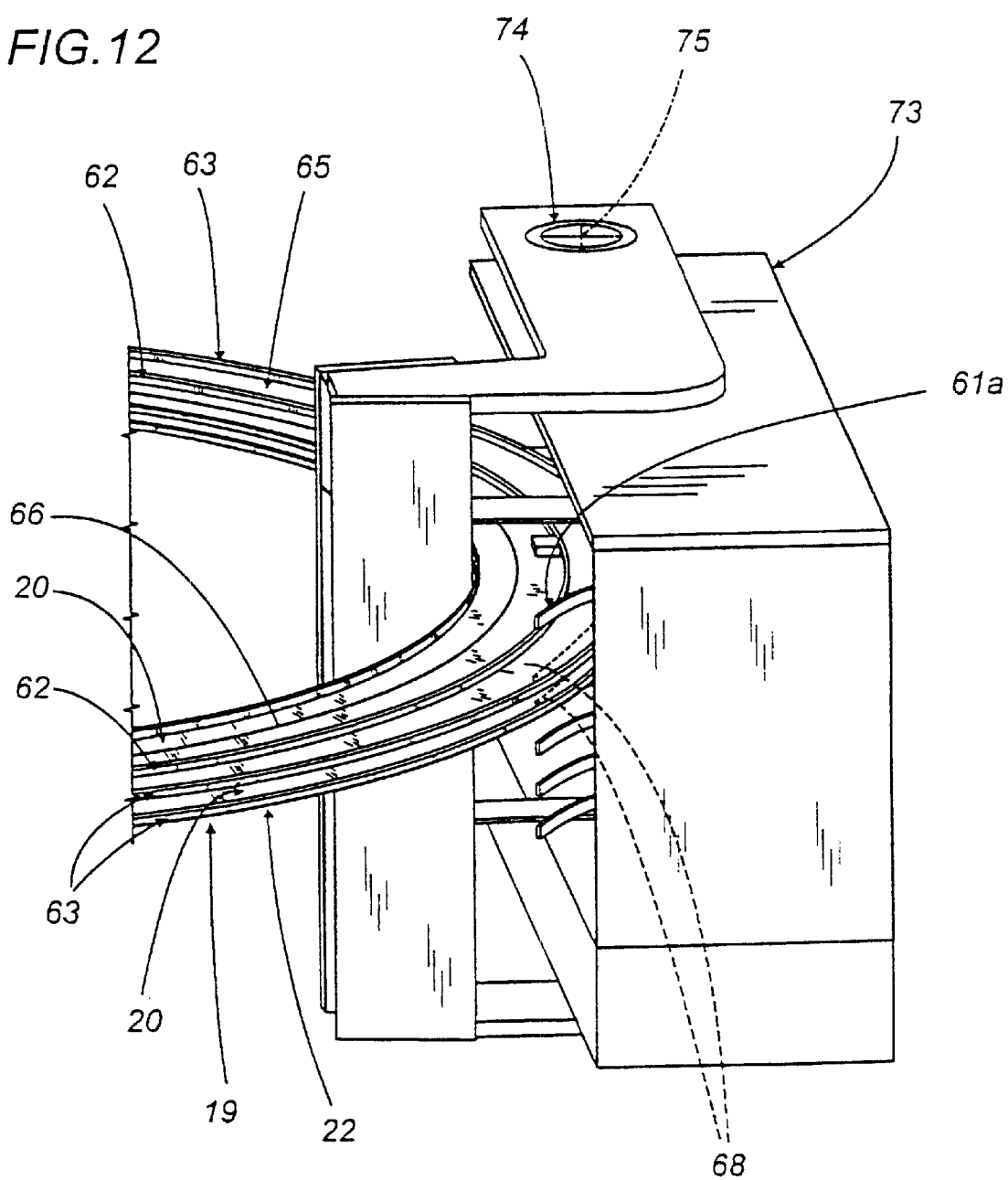
FIG. 12 shows the detail of FIG. 11, viewed schematically and in perspective with certain parts omitted, and including a further component.

Referring to FIGS. 8 and 12, the aforementioned linking means 43 are carried by a common frame 73 supported by a shaft 74 disposed with its axis 75 parallel to the axis 1a of the storage unit 1, and supported in its turn by respective top and bottom arms 80 connected to the frame 12 of the unit. The frame 73 is pivotable about the axis 75 between an operating position, illustrated in FIG. 12, in which two adjacent channels 22 are interconnected by the respective linking means 43 and the ends 61a of the internal vertical wall 61 associated with the respective chute 44 project above the adjacent annular channel 22 to function as means by which the packets 2 are diverted, and a non-operating position disengaged from the relative conveying members 19 as illustrated in FIG. 8, which in the interest of aiding the description also shows one of the linking means 43 in the operating position.

The operation of the storage unit 1 will now be described assuming the unit itself to be empty and the upstream and downstream machines 6 and 8 both operational, so that packets 2 of cigarettes can be directed into the storage unit 1 from the packer 6 by way of the loading station 3, and taken up by the cellophaner 8 at the unloading station 4.

The packets 2 typically must be released from the reservoir at intervals timed to coincide exactly with the movements of the working parts utilized in the cellophaner 8, and particularly the components (not illustrated, being of familiar type) by which the single packets 2 are picked up; to this end, when transferred from the last conveying member 19 in sequence to the infeed 7 of the cellophaner 8, the packets 2 will be made to pass along a linking conveyor (not illustrated) connected to a pickup station of the cellophaner 8, and decelerated by braking means (likewise not illustrated) in such a way as to form a continuous column of packets 2 advancing with no gap between one and the next.

Accordingly, the conveying member 19 connected to the infeed 7 of the cellophaner 8 at the unloading station 4 will be set in rotation by the relative motor 30 at a low peripheral speed, so that the packets 2 occupying the annular channels 22 are made to advance in relatively close order. This is illustrated by way of example in FIGS. 1 and 2, where D1 denotes a comparatively short distance between one packet 2 and the next.

By contrast, the conveying member 19 connected to the outfeed 5 of the packer 6 is set in rotation by the relative motor 30 at a peripheral speed higher than the speed of the final conveying member 19 in sequence, and in any event no less than the speed at which the packets 2 pass through the outfeed 5.

In the example illustrated, the peripheral speed induced in the first conveying member 19 by the relative motor 30 is higher than the initial speed at which the packets 2 leave the packer 6, so that the successive packets 2 can be taken up correctly from the packer 6 by the conveying member 19 and spaced apart one from the next by a predetermined distance. Thus, the distance D2 that separates the packets 2 carried by the first conveying member 19 in sequence, connected to the loading station 3, is greater than the distance D1 between the packets on the final conveying member 19 in sequence connected to the unloading station 4.

The packets 2 directed into the storage unit 1 by way of the loading station 3 are transferred from one conveying member 19 to the next, through to the unloading station 4.

To fill the storage unit 1 with packets 2 in as short a time as possible and begin supplying the cellophaner 8, the speed of the single conveying members 19 can be increased progressively, in which case the distance between successive packets 2 when transferred from a slower conveying member 19 to a faster conveying member 19 will be increased with each passage.

As the packets 2 approach the unloading station 4 however, they must be brought nearer to one another and therefore transferred from a faster conveying member 19 to a slower conveying member 19, so that when released at the infeed 7 of the cellophaner 8 they will be arranged in relatively close order.

In the event of the cellophaner 8 stopping and the packer 6 continuing to operate, the packets 2 are brought to a standstill on the final conveying member 19 as a queue forms at the infeed 7 of the machine 8, although the controller 53 will continue to pilot the movement of the conveying member 19 at minimum speed as the queue accumulates, until the relative sensor 55 covering the entry position 47 signals that this final conveying member 19 of the unit 1 is full.

The controller 53 responds by stopping the final conveying member 19, now full up, and decelerating the preceding conveying members 19 progressively. More exactly, the conveying member 19 immediately preceding the member just brought to a halt will continue operating at minimum speed before stopping in similar fashion; in this way, beginning with the conveying member 19 located near to the unloading station 4, as each conveying member 19 is filled, the preceding conveying member 19 is decelerated and brought ultimately to a halt, continuing thus in sequence until the entire reservoir is full.

In this situation, therefore, which contrasts with the normal conveying situation on the annular channel 22 of each conveying member 19, when there is no sliding contact between the packets 2 and the channel 22, the packets 2 will now begin sliding against the annular way 25 of the shelf 24, albeit the sliding contact occurs at an appreciably low rate of feed and only for the length of the path P compassed by the individual conveying member 19.

The sliding action thus affects only a limited number of the packets 2, which advance at minimum speed along a path of length such that the sliding movement will occasion no damage to the packets 2, thereby avoiding any deterioration attributable to impact and compression forces generated between the adjacent end faces 11 of the packets 2.

As discernible from the foregoing, each conveying member 19 constitutes an independent storage module and the distance between two successive packets 2, determined by the rate of feed along the single conveying member 19, reflects the capacity of the reservoir to accommodate additional packets 2. In other words, the operating margin of the storage unit 1, in terms of its capacity, is dependent on the difference between the distance D2 separating two successive packets 2 induced initially on the first conveying member 19 connected to the loading station 3, and the distance D1 separating packets 2 on the final conveying member 19 connected to the unloading station 4, when in operation and driven by the relative motor 30.

The speed at which the single conveying member 19 rotates is determined by the master controller 53, interlocked to the sensors 54, 55, 56 and 57, and will be regulated in such a way as to advance the packets 2 along the path P, varying the distance that separates each one from the next between the two aforementioned values D2 and D1 in accordance with the prevailing feed and storage requirements.

Accordingly, the distance between two successive packets 2 will vary "concertina" fashion according to the throughput required at any one time.

In the event of the packer 6 stopping and the cellophaner 8 remaining in operation, the conveying members 19 will continue to supply packets 2 at the operating tempo of the cellophaner 8 for a given duration.

The operation of the storage unit 1 in the case of the example illustrated in FIGS. 8 to 12 is the same in all respects as that already described referring to the example of FIGS. 1 to 7, the one difference being in the way that the packets 2 are caused to leave the one annular channel 22 and join the next channel 22 in sequence. In this instance, in effect, with the annular channel 22 rotating anticlockwise, the associated foil 65 is engaged by the deflector strip 67 and caused to flex gradually in such a way that an external portion 71 of the foil is shifted away from a position occupying the same plane as the annular way 25, as illustrated in FIG. 9, and toward a position as illustrated in FIG. 10 in which the external portion 71 occupies substantially the same plane as the chute 44 of the linking means 43. In this way, packets 2 near the exit position 46 of a given annular channel 22 are diverted initially by the end 61a of the internal vertical wall 61 and directed through the effect of centrifugal acceleration along the portion 71 of the foil 65 currently in the flexed configuration, and occupying substantially the same plane as the chute 44, toward the entry of the relative linking means 43. At the entry position 47 of an adjacent channel 22, similarly, the packets 2 are directed into the channel 22 by passing along the portion 71 of the foil 65, which in this instance likewise will be in the flexed configuration, lying above the annular wall 63 and occupying the same plane as the chute 44.

What is claimed is:

1. A storage unit of variable capacity for commodities affording a path along which commodities are caused to advance between a loading station and an unloading station, the storage unit comprising:

at least two conveying members ordered in succession along a predominating storage unit geometrical axis, each of the conveying members appearing as a circular element an extending along a respective path which describes a closed loop; means for linking the conveying members in series;

at least two motors, each motor being associated with one of the conveying members to set the conveying members in motion.

2. A storage unit as in claim 1, comprising a plurality of conveying members.

3. A storage unit as in claim 1, wherein the linking means are carried by a common frame supported by a shaft of which an axis is disposed parallel to the predominating axis, and rotatable thus about the selfsame axis between an operating position in which the respective conveying members are linked, and a non-operating position of disengagement distanced from the conveying members.

4. A storage unit as in claim 1, wherein each conveying member occupies a respective geometrical plane.

5. A storage unit as in claim 4, wherein said respective geometrical planes are disposed parallel one with another.

6. A storage unit as in claim 1, wherein each conveying member comprises at least one annular web associated with the respective motor and at least one annular channel supporting the commodities.

7. A storage unit as in claim 6, wherein the conveying members are coaxial one with another and with the predominating axis.

8. A storage unit as in claim 6, wherein the conveying member comprises at least two annular channels occupying respective mutually parallel planes and coaxial one with another.

9. A storage unit as in claim 8, wherein the at least two annular channels are interconnected by the linking means.

10. A storage unit as in claim 6, comprising a master controller interlocked to a plurality of sensing means corresponding in number to the number of single conveying members, such as will generate respective output signals both indicating the proximity of the commodities and identifying the position occupied by each commodity relative to the commodities preceding and following along each annular channel of each conveying member, and send the signals to the controller.

11. A storage unit as in claim 10, wherein the master controller is connected on the output side to each of the motors in such a manner as to regulate the speed at which the single conveying members rotate about the axis according to the information in the output signals received from the sensing means and to control the rate at which the commodities advance on each conveying member, thereby verifying and controlling the extent to which each conveying member is filled.

12. A storage unit as in claim 6, wherein the motor comprises a wheel engaging a surface of the annular web.

13. A storage unit as in claim 12, comprising pinch rollers positioned in opposition to the wheel, operating in conjunction with the wheel and offered in contact to a surface of the annular web opposite to the surface engaged by the wheel.

14. A storage unit as in claim 12, wherein drive is transmitted from the wheel to the annular web by friction.

15. A storage unit as in claim 1, wherein each of the conveying members presents an entry position and an exit position, both determined by the linking means, at which the commodities are received from a preceding annular channel and released to a successive annular channel, respectively.

16. A storage unit as in claim 15, wherein the linking means comprise at least one connecting chute interconnecting each two consecutive annular channels.

17. A storage unit as in claim 16, wherein each conveying member comprises: at least one annular channel (22); an annular way in said at least one annular channel; vertical annular walls compassing internally and externally said annular way; an annular foil positioned over the annular way and permanently associated with the channel.

18. A storage unit as in claim 17, wherein the annular foil is anchored by an internal edge to a flat surface of the annular way; the annular channel being associated with stationary deflector means interposed between the flat surface and the annular foil in a position of close proximity to the external vertical annular wall, said deflector means presenting a first portion of ascending wedge profile and a second portion of constant height substantially equal to the height of the external vertical wall of the annular channel, extending at least through the exit position of the relative annular channel.

19. A storage unit as in claim 18, wherein the flat surface of the annular way presented by each annular channel affords a plurality of angularly equispaced open slots.

20. A storage unit as in claim 18, wherein the ascending first portion is located immediately preceding the exit position of a respective annular channel, the second portion of constant height coincides with an arc extending substantially between the exit position and the entry position, each of the deflector means also comprises a descending third portion located beyond the entry position, relative to the direction of rotation followed by the conveying members about the predominating axis.

21. A storage unit as in claim 20, wherein the annular foil is caused to flex elastically on encountering the second portion of constant height presented by the deflector means, in such a manner that an external portion of the foil occupies substantially the same plane as the chute of the respective linking means.

22. A storage unit as in claim 16, wherein the at least one chute incorporates respective propulsion means by which the commodities are caused to advance along the selfsame chute.

23. A storage unit as in claim 22, wherein propulsion means comprise jets of a pressurized fluid.

24. A storage unit as in claim 22, wherein the chute comprises respective manifold means associated with the propulsion means.

25. A storage unit as in claim 24, wherein the chute presents two ends and said manifold means comprise two walls, one of which affording a surface slidably supporting the commodities, joined together at the ends of the chute and compassing a chamber connected to a source of pressurized fluid and to a plurality of pin holes distributed uniformly along the surface of the wall slidably supporting the commodities.

26. A storage unit as in claim 25, wherein the chamber is enclosed by two vertical walls one on either side, said two vertical walls bordering the sliding surface afforded by the wall, at least one vertical wall exhibiting two opposite ends projected above the adjacent annular ways and affording means to divert the commodities.

* * * * *